(12) United States Patent
Ladouceur et al.

(10) Patent No.: US 8,704,648 B2
(45) Date of Patent: Apr. 22, 2014

(54) RECONFIGURABLE KEYFIELD ON A COMMUNICATION DEVICE

(75) Inventors: Norman Ladouceur, Waterloo (CA); Jason T. Griffin, Kitchener (CA); Roman Rak, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1440 days.

(21) Appl. No.: 12/040,640

(22) Filed: Feb. 29, 2008

(65) Prior Publication Data

US 2009/0219176 A1 Sep. 3, 2009

(51) Int. Cl.
*G08B 6/00* (2006.01)

(52) U.S. Cl.
USPC ............ 340/407.2; 340/999; 341/20; 341/22; 345/168; 345/169; 400/489; 400/472

(58) Field of Classification Search
USPC ............ 340/407.2, 999; 341/22, 20; 345/161, 345/168; 400/489, 472
See application file for complete search history.

(56) References Cited

U.S. PATENT DOCUMENTS

| | | | | |
|---|---|---|---|---|
| 5,172,114 A | * | 12/1992 | Bedoya et al. | 341/27 |
| 5,508,719 A | * | 4/1996 | Gervais | 345/157 |
| 8,132,976 B2 | * | 3/2012 | Odell et al. | 400/491 |
| 8,217,288 B2 | * | 7/2012 | Ladouceur et al. | 200/341 |

FOREIGN PATENT DOCUMENTS

| | | |
|---|---|---|
| EP | 1256968 | 10/2000 |
| EP | 1197835 A | 4/2002 |
| EP | 1217808 | 6/2002 |
| WO | 0171746 A | 9/2001 |

OTHER PUBLICATIONS

Extended European Search Report dated Oct. 13, 2008. In corresponding application No. 08152147.8.
Partial European Search Report for European Patent Application 08152147.8, dated Jun. 26, 2008.

* cited by examiner

*Primary Examiner* — Steven Lim
*Assistant Examiner* — Hongmin Fan
(74) *Attorney, Agent, or Firm* — Fitch, Even, Tabin & Flannery LLP

(57) ABSTRACT

A handheld communication device having a reconfigurable keyfield and a display screen upon which characters are displayed. A plurality of actuable input keys makeup the keyfield, and each has at least one character associated therewith and an engageable top surface for actuation. A microprocessor is configured to receive data indicative of an actuated input key and to output data indicative of an associated character determined to correspond to the indicated input key. At least one of the plurality of actuable input keys is mounted to the handheld communication device by an adjustable interconnection configurable between at least first and second operating orientations. In the first operating orientation, the engageable top surface of the at least one input key faces a first direction and in the second operating orientation the engageable top surface of the at least one input key faces a second direction.

4 Claims, 16 Drawing Sheets

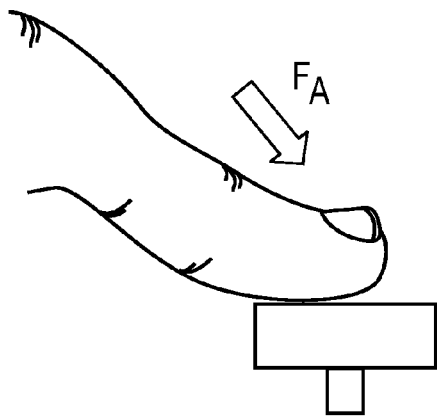
FIG. 16A
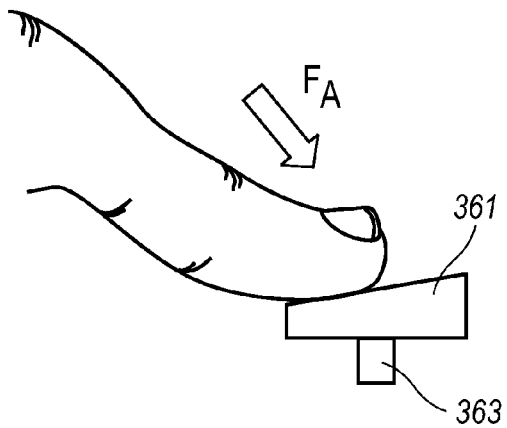
FIG. 16B
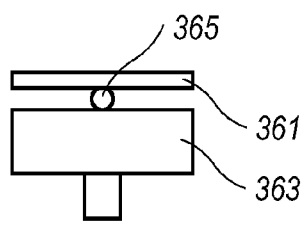
FIG. 17A
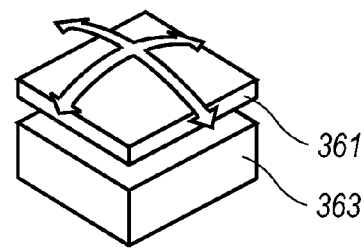
FIG. 17B
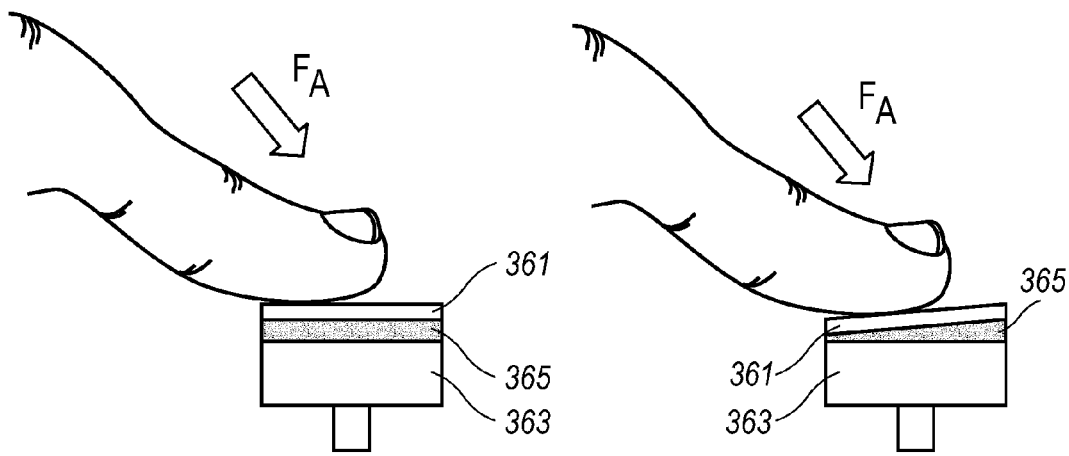
FIG. 18A
FIG. 18B

US 8,704,648 B2

RECONFIGURABLE KEYFIELD ON A COMMUNICATION DEVICE

FIELD

This disclosure, in a broad sense, is directed toward an electronic device that has communication capabilities. The present disclosure further relates to: providing input keys that avoid fatigue and discomfort during extended text messaging periods; providing input keys that avoid discomfort caused by hard typing during messaging; and providing input keys that physically reconfigure depending on the program that is presently running on the communication device for easy recognition of the input keys that are active for that program.

BACKGROUND

In many fields, it is known that prolonged use of certain tools of the trade that require the user to maintain the same position or perform repetitive motions for extended periods of time are at least fatigue inducing. Typically, this fatigue manifests as relatively innocuous muscle tiredness and even mild soreness, but prolonged and extended engagement in such repetitive motions can be more problematic. Among others, de Quervain's Syndrome, bursitis and tendonitis represent manifestations of repetitive motion disorders, also referred to as repetitive strain injuries. One familiar malady of this type effects keyboardists and is known as carpel tunnel syndrome. Though an extreme example, carpel tunnel syndrome provides an example of the importance of addressing issues caused by prolonged repetitive motions before they become more serious, especially when the conditions causing the ailments can be relieved through modification of the devices inducing the problems.

BRIEF DESCRIPTION OF THE DRAWINGS

Exemplary arrangements configured according to the advantageous solutions presented herein are depicted in the accompanying drawings wherein:

FIGS. 16A-22B illustrate input keys that reconfigure responsively to an applied actuation force for minimizing discomfort associated with prolonged text entry and hard keyboarding.

DETAILS

In today's technology driven society, handheld communication devices have become as much of a tool of many trades, and they are also a consumer electronic device. Not only are telephone calls placed on such communication devices, but short text messages and more lengthy emails are almost constantly being input by a growing number of users. While availability of wireless communications has also increased many communication devices also include the option for wireless communication. Even though these communication devices provide the user essentially untethered communication capabilities, the consequences of their small size and necessarily close-together key arrangements can also induce fatigue and pain under extended use conditions.

For instance, the input keys and the keyfields they constitute on these relatively small communication devices are also commensurately compact. As a result, predominantly thumb typing techniques have emerged for inputting text via these small keyfields 332 as demonstrated in FIG. 1 of the accompanying drawings. A consequence is that these communication devices 300 are typically held by a user in one or both hands in a rather tight fashion so that the thumb(s) remain poised to rapidly strike keys of the keyfield 332 for character input when entering text or other data into the communication device 300. Further, studies show that when messaging (sending text messages, emails or the like), a user typically keeps his/her shoulders and upper arms tense which reduces blood circulation to the forearms where it is especially needed during these periods of intense keyboarding. As used herein, a keyfield is group of input keys that make up at least a portion of the keyboard for the communication device.

One proposed remedy is to breakup a long keyboarding session with rest periods that can optionally include massage and stretching exercises. For most users, however, these remedies are not practical because time is often short and many messages must be sent urgently, especially where fast-paced professionals are concerned. Therefore the present disclosure is directed to adaptations that can be instituted in the input keys of the communication devices 300 that reduce user fatigue and discomfort when engaged in prolonged periods of messaging. In another aspect, the present disclosure is directed toward input keys that are physically reconfigured based on the program running on the communication device 300 in support of the particular program.

Figure 1:
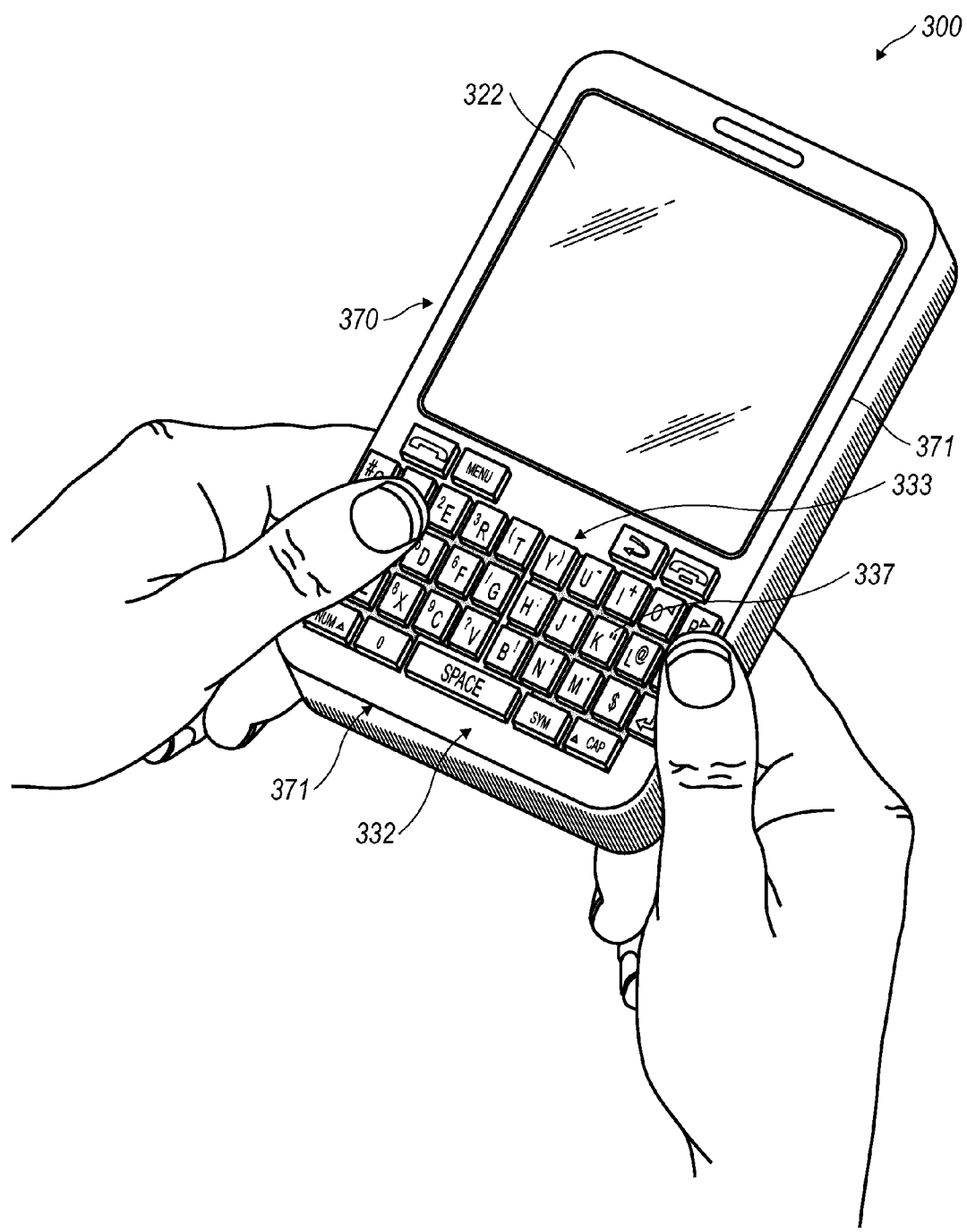
FIG. 1 is a perspective view of a handheld communication device having a full QWERTY keyfield and being cradled in both hands by an user in an orientation for text input.
Figure 2:
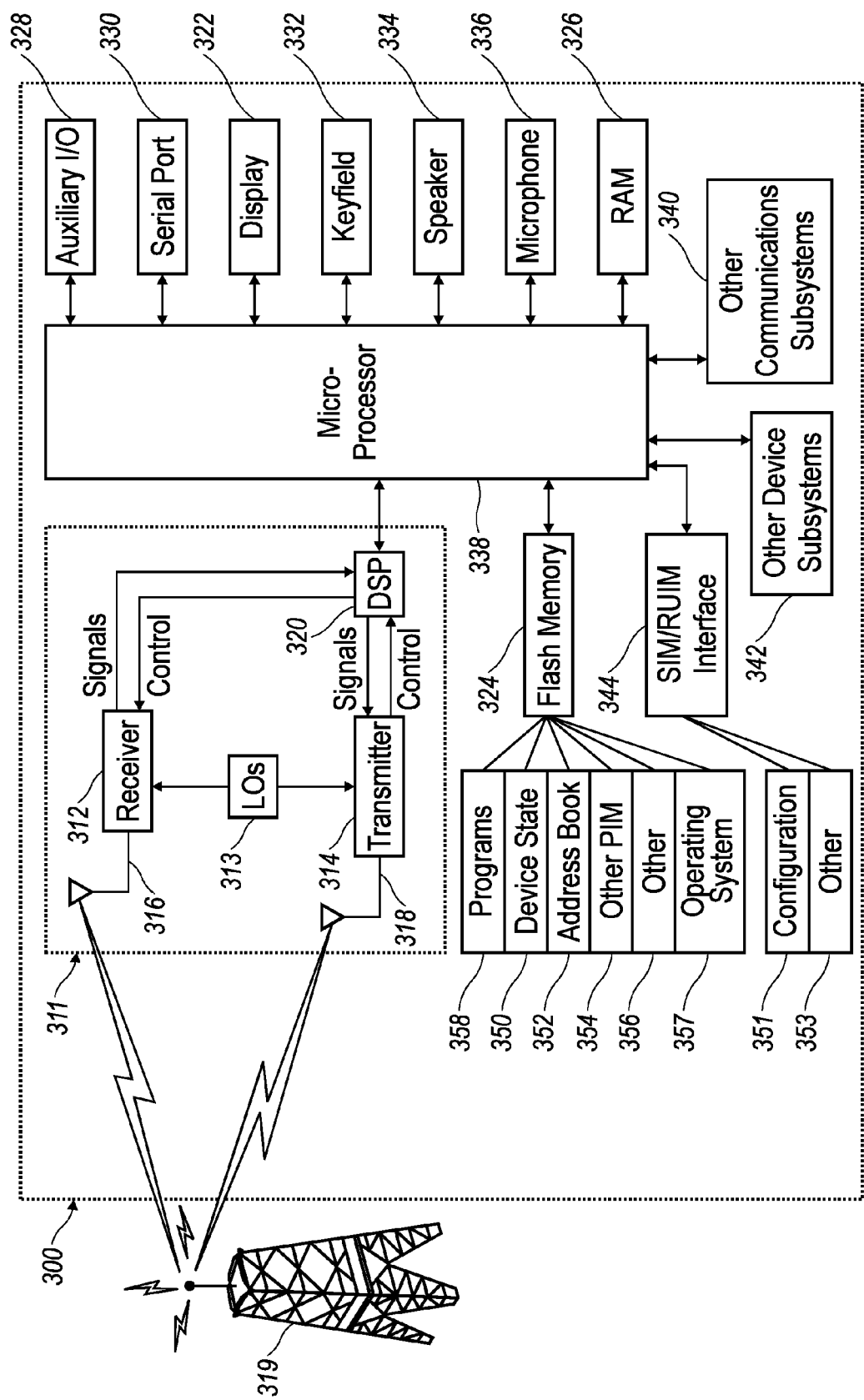
FIG. 2 is a block diagram representing a handheld communication device interacting in a communication network.

An exemplary communication device 300 is shown in FIG. 1, and the communication device's cooperation in a wireless network 319 is exemplified in the block diagram of FIG. 2. These figures are exemplary only, and those persons skilled in the art will appreciate the additional elements and modifications necessary to make the communication device 300 work in particular network environments. While in the illustrated embodiment the communication device 300 comprises a handheld communication device in other embodiments the communication device 300 can comprise a handheld wireless communication device, a personal digital assistant (PDA) or other similarly compact communication device with a commensurately small and compact keyfield.

As shown in the block diagram of FIG. 2, the communication device 300 includes a microprocessor 338 that controls the operation of the communication device 300. A communication subsystem 311 performs all communication transmission and reception with the wireless network 319. Additionally, in at least one embodiment, the microprocessor 338 can be connected to a serial port (for example, a Universal Serial Bus port) 330 which can allow for communication with other devices or systems via the serial port 300. A display 322 can be connected to microprocessor 338 to allow for displaying information to a user of the communication device. The communication device 300 is equipped with a keyfield 332 which is also in signal communication with the microprocessor 338. The communication device 300 can include a speaker 334, a microphone, 336, random access memory (RAM) 326, and flash memory 324 all of which may be communicatively connected to the microprocessor 338.

Other components may be provided on the communication device 300 as well and optionally connected in communication with the microprocessor 338. Other communication subsystems 340 and other device subsystems 342 are also generally indicated as being functionally and communicatively connected with the microprocessor 338, as well. An example of a communication subsystem 340 is that of a short range communication system such as a BLUETOOTH® communication module or a WI-FI® communication module (a communication module in compliance with IEEE 802.11b) and associated circuits and components. Additionally, the microprocessor 338 is able to perform operating system functions and enables execution of programs on the communication device 300. In some embodiments, not all of the above components may be included in the communication device 300. For example, in at least one embodiment the keyfield or keyboard 332 is not provided as a separate component and is integrated with the communication device 300.

The auxiliary I/O subsystem 328 can take the form of a variety of different navigation tools (multi-directional or single-directional) such as a trackball navigation tool, a thumbwheel, a navigation pad, a joystick, touch-sensitive interface, or other I/O interface. These navigation tools may be located on the front face 370 of the communication device 300 or may be located on any exterior surface of the communication device 300. Other auxiliary I/O subsystems can include external display devices and externally connected keyboards. While the above examples have been provided in relation to the auxiliary I/O subsystem 328, other subsystems capable of providing input or receiving output from the communication device 300 are considered within the scope of this disclosure. Additionally, other keys may be placed along the side of the communication device 300 to function as escape keys, volume control keys, scrolling keys, power switches, or user programmable keys, and may likewise be programmed accordingly.

As may be appreciated from FIG. 1, the communication device 300 comprises a lighted display 322 located above a keyfield 332 constituting a user input and suitable for accommodating textual input to the communication device 300. As shown, the communication device 300 is of unibody construction.

Keys, typically of a push-button nature perform well as data entry devices, but present problems to the user when they must also be used to effect navigational control over a screen-cursor. In order to solve this problem, the present communication device 300 may include an auxiliary input that acts as a cursor navigation tool and which is typically exteriorly located upon the front face 370 of the communication device 300. Its front face location allows the tool to be easily thumb-actuable like the keys of the keyfield 332. One embodiment provides the navigation tool in the form of a trackball which can be utilized to instruct two-dimensional screen cursor movement in substantially any direction as well as act as an actuator when the trackball is depressed like a button. The placement of the navigation tool may be above the keyfield 332 and below the display screen 322; here, it can avoid interference during keyboarding and does not block the user's view of the display screen 322 during use.

The communication device 300 of FIG. 1 is configured to send and receive messages. The communication device 300 includes a body which may, in some embodiments, be configured to be held in one hand by a user of the communication device 300 during text entry. A display screen 322 is located on the front face 370 of the body and information is displayed to the user during text entry on the screen 322. The communication device 300 may also be configured to send and receive voice communications such as mobile telephone calls.

Furthermore, the communication device 300 is equipped with components to enable operation of various programs as shown in FIG. 2. In an exemplary embodiment, the flash memory 324 is enabled to provide a storage location for the operating system 357, device programs 358, and data. The operating system 357 is generally configured to manage other programs 358 that are also stored in memory 324 and executable on the processor 338. The operating system 357 honors requests for services made by programs 358 through predefined program 358 interfaces. More specifically, the operating system 357 typically determines the order in which multiple programs 358 are executed on the processor 338 and the execution time allotted for each program 358, manages the sharing of memory 324 among multiple programs 358, handles input and output to and from other device subsystems 342, and so on. In addition, users can typically interact directly with the operating system 357 through a user interface usually including the keyboard 332 and display screen 322. While in an exemplary embodiment the operating system 357 is stored in flash memory 324, the operating system 357 in other embodiments is stored in read-only memory (ROM) or similar storage component. As those skilled in the art will appreciate, the operating system 357, device program 358, or parts thereof, may be loaded in RAM 326 or other volatile memory.

In one exemplary embodiment, the flash memory 324 contains programs 358 for execution on the communication device 300 including an address book 352, a personal information manager (PIM) 354, and the device state 350. Furthermore, programs 358 and other information 356 including data can be segregated upon storage in the flash memory 324 of the communication device 300.

When the communication device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 300 may require a unique identifier to enable the communication device 300 to transmit and receive signals from the communication network 319.

Other systems may not require such identifying information. GPRS, UMTS, and EDGE use a Subscriber Identity Module (SIM) in order to allow communication with the communication network 319. Likewise, most CDMA systems use a Removable Identity Module (RUIM) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the communication device 300 allows for removal or insertion of a SIM/RUIM card. The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of information can be from the communication device 300 or to the communication device 300. In order to communicate with the communication network 319, the communication device 300 in the presently described exemplary embodiment is equipped with an integral or internal antenna 318 for transmitting signals with the communication network 319. Likewise, the communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the communication device 300.

When equipped for two-way communication, the communication device 300 features a communication subsystem 311. As is understood in the art, this communication subsystem 311 is modified so that it can support the operational needs of the communication device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the communication device 300 with the wireless network 319 can be any type of communication that both the wireless network 319 and communication device 300 are enabled to transmit, receive and process. In general, these can be classified as voice and data. Voice communication generally refers to communication in which signals for audible sounds are transmitted by the communication device 300 through the communication network 319. Data generally refers to all other types of communication that the communication device 300 is capable of performing within the constraints of the wireless network 319.

Example device programs that can depend on such data include email and other text message programs, as well as programs for contact or calendar management. For each such program, synchronization with home-based versions on the programs can be desirable for either or both of their long term and short term utility. As an example, emails are often time sensitive, so substantially real time synchronization may be desired. Contacts, on the other hand, can usually be updated less frequently without inconvenience. Therefore, the utility of the communication device 300 is enhanced when connectable within a communication system, and when connectable on a wireless basis in a network 319 in which voice, text messaging, and other data transfer is accommodated.

The keyfield 332 includes a plurality of input keys that are physical in nature such as actuable buttons. It is also contemplated that the input keys can be provided to include as a combination of the two types of key functions. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space.

Some, but not all of the input keys may be virtual keys, the indicia for which are shown on the display screen 322, which in one embodiment is enabled by touching the display screen 322, for example, with a stylus, finger, or other pointer, to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. Physical and virtual keys can be combined such that the plurality of enabled keys for a particular program or feature of the communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

While the above description generally describes the systems and components associated with a handheld communication device, the communication device 300 could be another communication device such as a PDA or similarly small and compact communication device. In those embodiments, different components of the above system might be omitted in order provide the desired communication device 300. Additionally, other components not described above may be required to allow the communication device 300 to function in a desired fashion. The above description provides only general components and additional components may be required to enable the system to function. These systems and components would be appreciated by those of ordinary skill in the art Referring again to FIG. 1, a typified communication device 300 is shown in perspective, cradled in a user's two hands in a texting orientation. The front face 370 of the communication device 300 includes the display screen 322 which is located above the keyfield 332 of user input keys 333. The keyfield 332 includes actuable keys 333 for at least character input, function actuation and operational mode selection such as between text messaging mode(s) and telephone calling. In this example, the user's two thumbs are poised for ready movement about the keyfield 332 for sequentially actuating a series of keys 333 for inputting a message such as a short message service (SMS) text, multimedia messaging service (MMS) or an email.

One type of solution that has been discovered for avoiding fatigue and discomfort associated with prolonged periods of text messaging is exemplified in FIGS. 3-7. In general, the solution is to enable one or more of the actuable input keys 333 to be variously configurable relative to the communication device 300. In particular, a key 333 or group of keys is mounted to the communication device 300 utilizing an adjustable interconnection 335. This interconnect 335 permits the position of engageable top surface(s) 337 of the key(s) 333 to be periodically adjusted so that the orientation of the user's working digits (fingers/thumbs) must change, even if only slightly, for aligned engagement with the new orientation of the key top surfaces 337. Because of the reconfiguration of the key(s) 333 and the necessitated reorientation of the user's hand(s), the fatigue and discomfort previously experienced is avoided.

Figure 3:
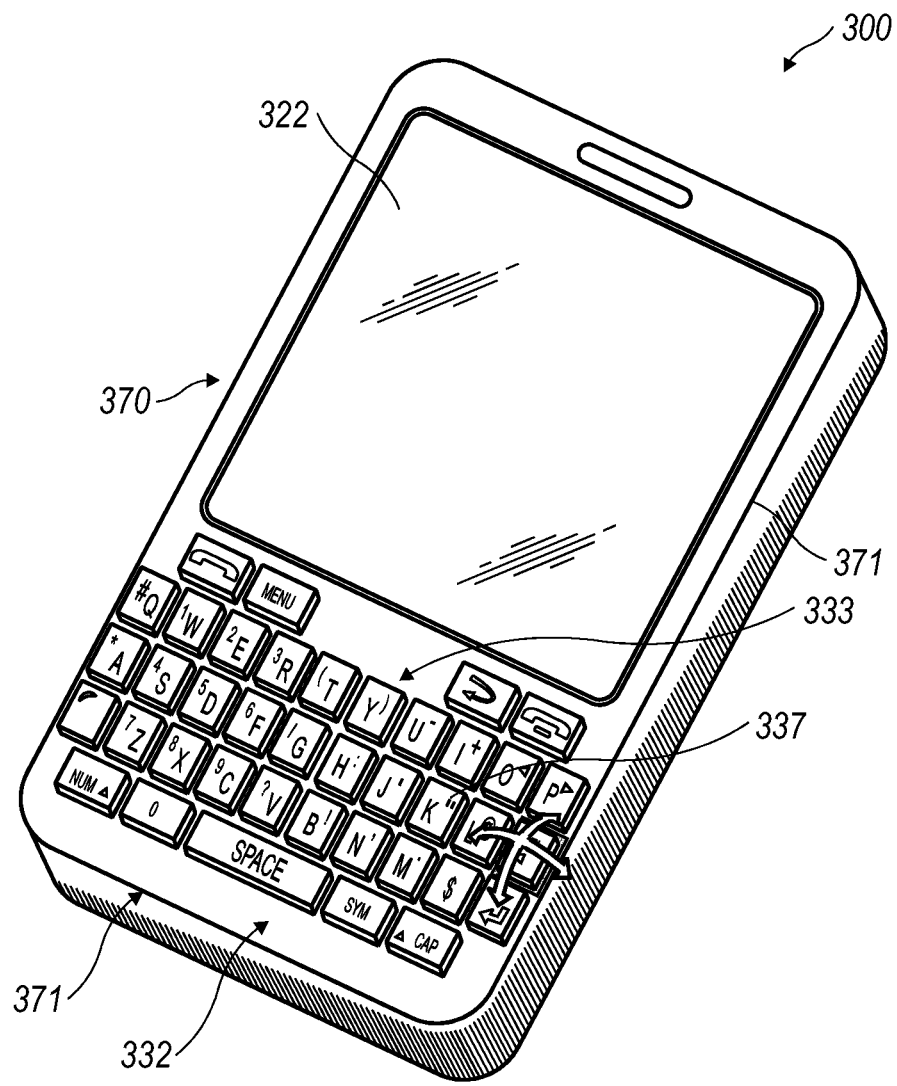
FIG. 3 is a perspective view of a handheld communication device showing an individual key that is reconfigurable for avoiding repetitive motion fatigue from messaging.
Figure 4:
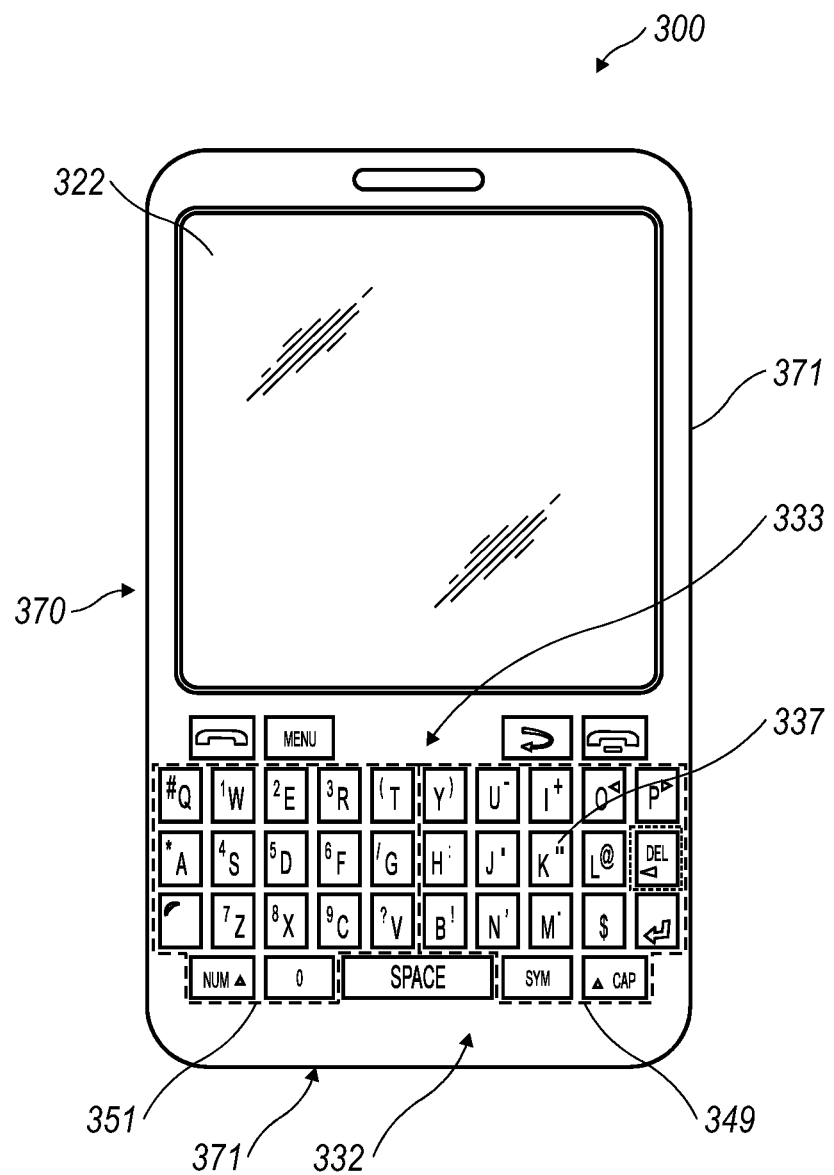
FIG. 4 is a front elevational view of the handheld communication device of FIG. 3 identifying one individual key that is reconfigurable for avoiding repetitive motion fatigue from messaging.
Figure 5:
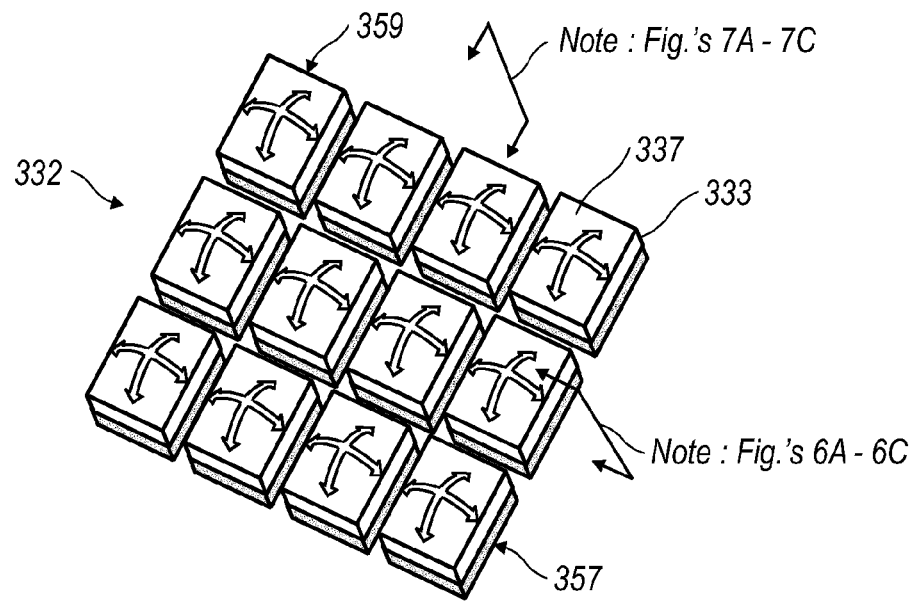
FIG. 5 is a perspective view of a 4×3 group of individually configurable input keys showing that each key can rock about at least two axes in the illustration.

Referring to FIGS. 3 and 4, a communication device 300 that has a reconfigurable keyfield 332 of the nature described above is depicted. The communication device 300 comprises a display screen 322 upon which information, including typed-in characters, are displayed. An abbreviated keyfield 332 is shown in FIG. 5, and which includes a plurality of actuable input keys 333, each having at least one character associated therewith as typified in FIGS. 3 and 4. Further, each key 333 has an engageable top surface 337 configured for actuation by a user, typically through digital (finger/thumb) engagement. Among others, characters, including letters and numbers are associated with the keys 333 and accommodate the composition of messages on the communication device 300. Typically, functions such as shift, return and backspace can also be associated with certain of the keys 333 to facilitate messaging.

The microprocessor 338 is included on the communication device 300 and is configured to receive, process and output data. Received data can originate remotely and be sent to the communication device 300, or it can be generated locally. In one instance, input data to the microprocessor 338 is generated locally by the user striking a select input key 333. In this case, the data received by the microprocessor 338 is indicative of a particular input key 333 that has been actuated. The microprocessor 338 processes that data and based on the indicated key, determines a character, such as a number or letter, associated therewith. Among other means, lookup tables can be utilized, as can algorithms for ascertaining the user-selected character. Based on the determination, output data indicative of the associated character determined to correspond to the indicated input key 333 that has been actuated is generated by the microprocessor 338. Typically this generated data constitutes control data for the display screen 322 and causes the determined character to be displayed thereupon.

Figure 6A:
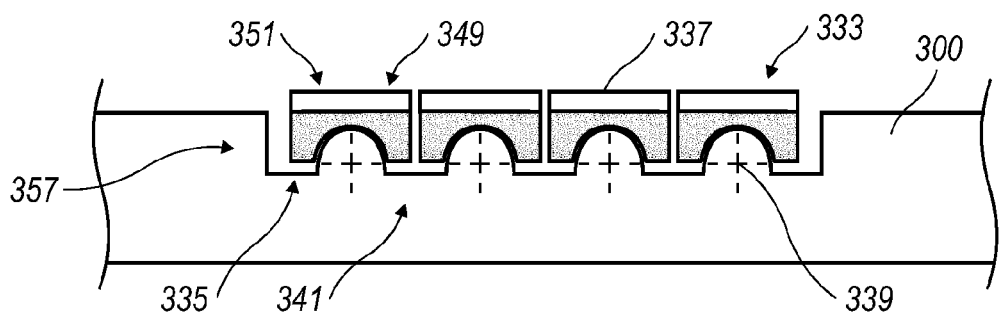
FIG. 6A illustrates a row of keys from FIG. 5 in an untilted orientation.
Figure 6B:
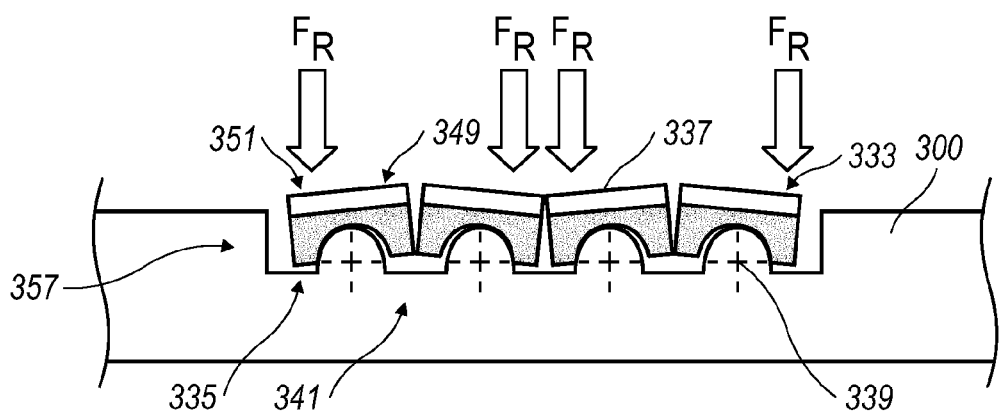
FIG. 6B illustrates the row of keys from FIG. 6A, but the several independent keys have been variously repositioned.

To facilitate reconfiguration of the keyfield 332, at least one of the plurality of actuable input keys 333 is mounted to the communication device 300 by an adjustable interconnection configurable between at least first and second operating orientations. In the first operating orientation, the engageable top surface 337 of one or more of the input keys 333 face a first direction as depicted in FIG. 6A. In the second operating orientation, those same engageable top surfaces face one or more second directions as exemplified in FIG. 6B. In this manner, the user is compelled to commensurately reposition his or her striking digits, as well as change their orientation used when striking the moved engagement surfaces 337 of the keys 333. This breaks the monotony of the repetitive action and avoids the user fatigue and discomfort that would otherwise accompany extended periods of typing on the keyfield 332.

As depicted in FIGS. 3-7 where independently moveable keys 333 are shown, the adjustable interconnection 335 comprises a pivotable mechanism 341 configured to rotate the engageable top surface 337 of the input key 333 about a pivot axis 339 between first and the second operating orientations.

Figure 6C:
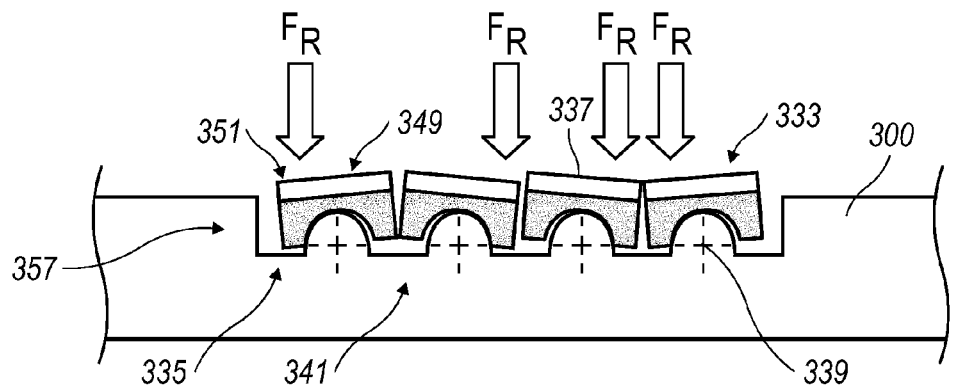
FIG. 6C illustrates the row of keys from FIG. 6B, reconfigured once again.
Figure 7A:
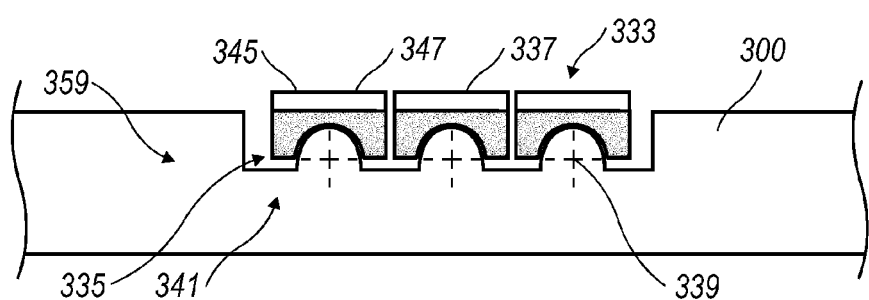
FIG. 7A illustrates a column of keys from FIG. 5 in an untilted orientation.
Figure 7B:
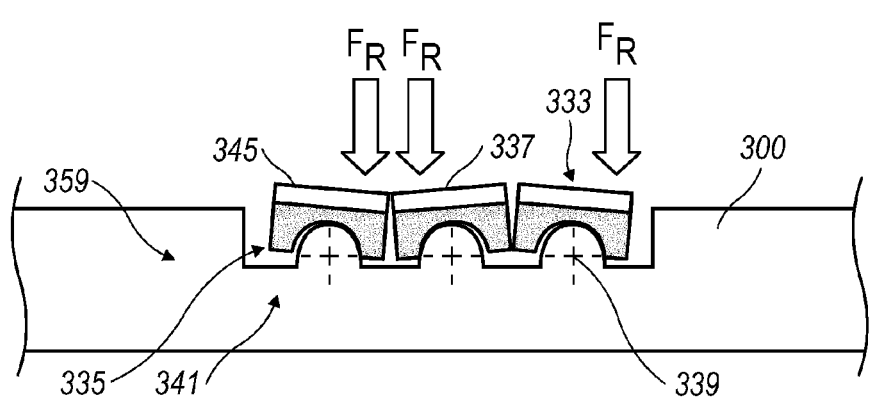
FIG. 7B illustrates the column of keys from FIG. 7A, but the several independent keys have been variously repositioned.
Figure 7C:
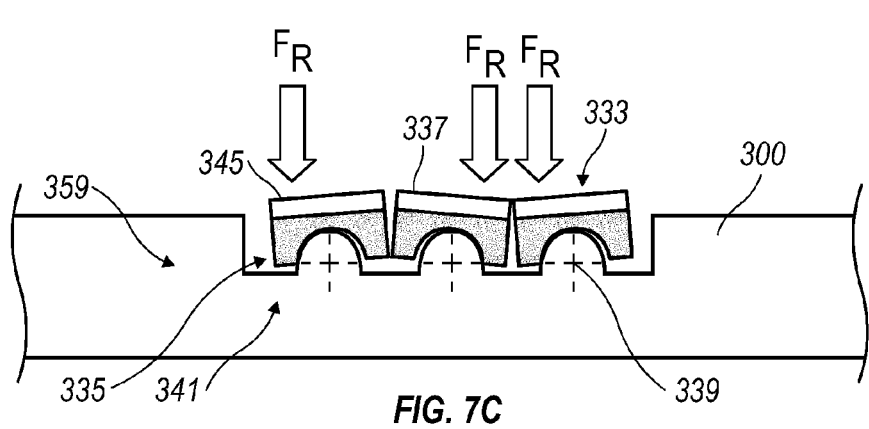
FIG. 7C illustrates the column of keys from FIG. 7B, reconfigured once again.

As illustrated in FIGS. 5-6, at least one of the pivot axes 339 about which the pivotable mechanism 341 rotates the engageable top surfaces 337 of the input keys 333 is substantially horizontally oriented relative to the front face 370 of the communication device 300. In this instance, the upper parts 345 and lower parts 347 of the affected key(s) rock up and down. As illustrated in FIGS. 5 and 7, another possible pivot axis 339 about which the pivotable mechanism 341 rotates the engageable top surfaces 337 of the input keys 333 is substantially vertically oriented relative to the front face 370 of the communication device 300. Therefore, in this instance, the right-hand sides 349 and left-hand sides 351 (illustrated in FIG. 4) of the affected key(s) 333 rock up and down. When the right-hand side 349 platform and left-hand side platform is provided as illustrated, the right-hand side 349 is able to move independently from the left-hand side and vice-versa.

In an alternative but similar configuration depicted in FIG. 11-14, a plurality of the actuable input keys 333 are installed on a platform 343 interconnected to the communication device 300 by an adjustable interconnection 335. As in the former example concerning a single key 333, the adjustable interconnection 335 in this instance also includes a pivotable mechanism 341 configured to rotate the engageable top surfaces 337 of the plurality of input keys 333 about a pivot axis 339 between the first and the second operating orientations, but with the keys 333 moving together on the common platform 343.

It is also contemplated that the individual keys 333 and the described platform 343 with keys 333 can be mounted to the communication device 300 on a swivel-type adjustable interconnection that accommodates key 333 repositioning in substantially any direction.

In all cases, a higher magnitude force is required to reposition the key 333 or platform 343 with keys 333 than is required to actuate the keys 333. In this manner, reconfiguration does not occur during text entry when a lighter touch is being used for typing, but can easily be achieved by the user by pressing harder on the portion of the key 333 or platform 343 of keys 333 desired to be rocked downward.

Figure 8:
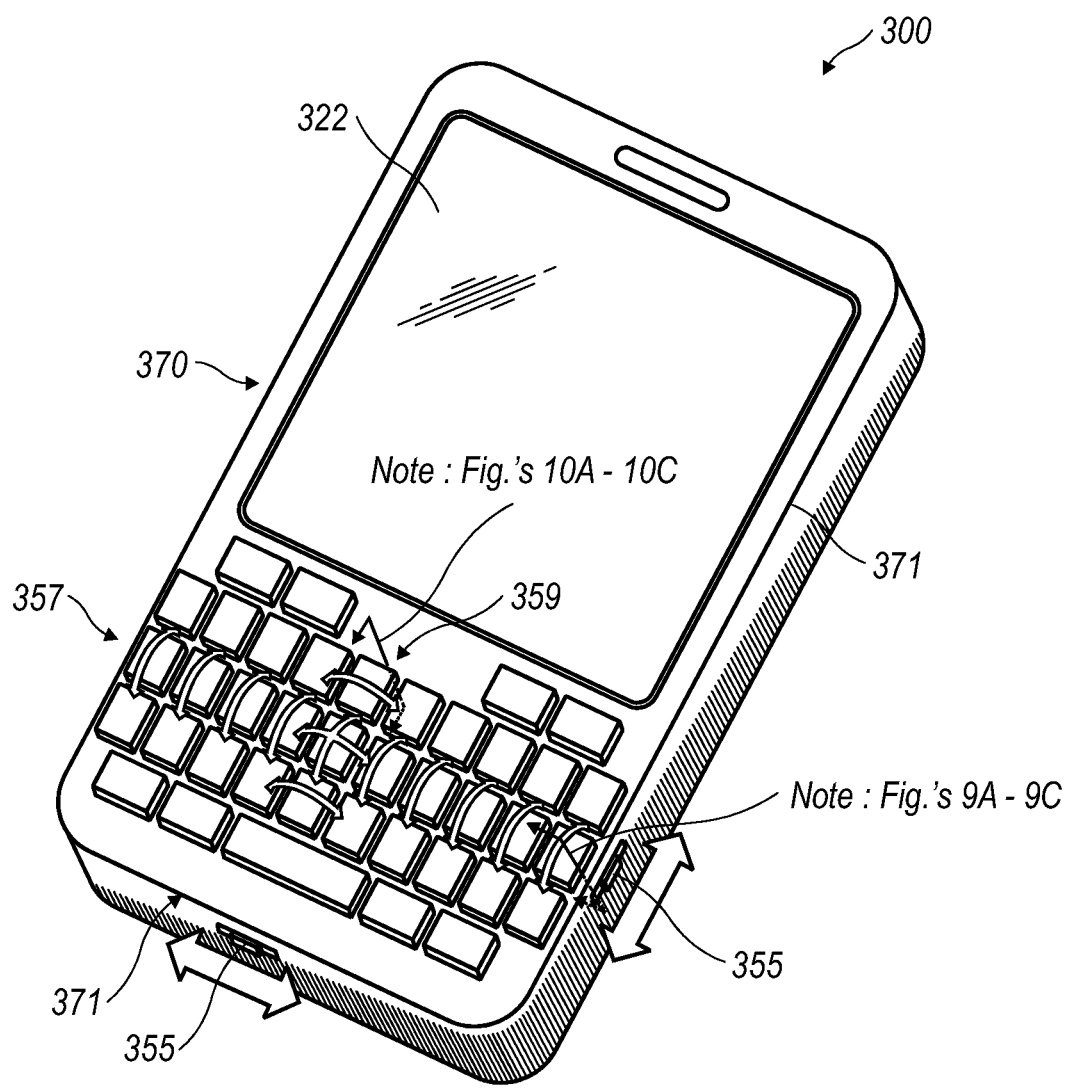
FIG. 8 is a perspective view of an exemplary handheld communication device showing a row of keys pivotable about horizontally oriented axes and a column of keys pivotable about vertically oriented axes.

In FIGS. 8-10, the reconfiguration of individual keys 333 is disclosed, though simultaneously in groups. Here, at least one repositionable, multi-position control lever 353 is interconnected with the pivotable mechanism 341 to reconfigure the adjustable interconnection 335 between the first and second operating orientations. As depicted in FIG. 8, two control levers 353 are incorporated and each includes an engageable sliding member 355 that translates between first and second positions relative the front face 370 of the communication device 300 in correspondence with reconfiguration of the adjustable interconnection 335 between the first and second operating orientations. Advantageously, and as shown, each of the engageable sliding members 355 of the respective multi-position control levers 353 are located adjacent to, and translate substantially parallel with an edge 371 of the front face 370 of the communication device 300. It is contemplated that a control lever 353 can be directly connected to an adjustable interconnection 335 for pushing, pulling or rotating an interconnected key or keys 333 in a particular direction.

It is also contemplated that the lever 353 can control one or more cam surfaces within the adjustable interconnection that when rotated causes the associated key or keys to reconfigure relative the front face 370 of the communication device 300.

Figure 9A:
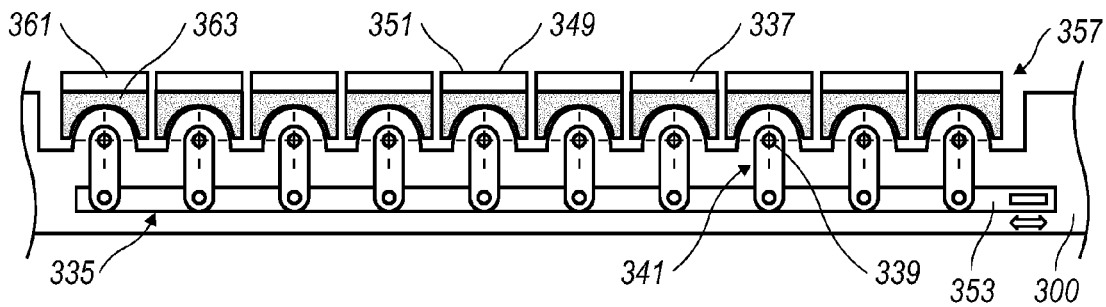
FIG. 9A illustrates the designated row of keys from FIG. 8 in an untilted orientation.
Figure 9B:
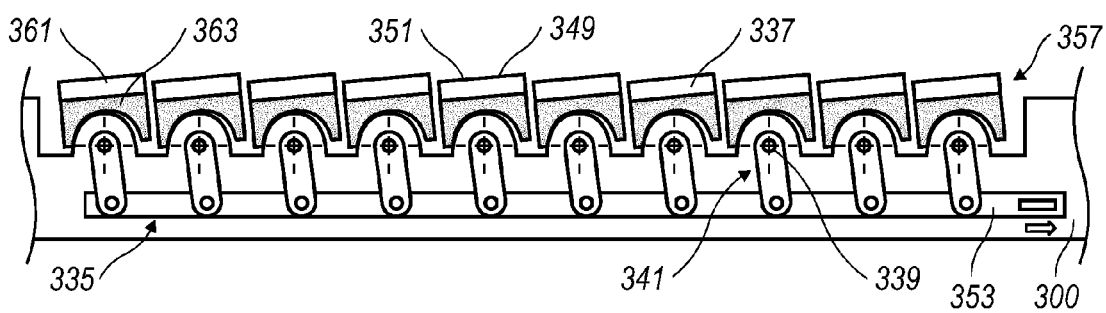
FIG. 9B illustrates the row of keys from FIG. 9A uniformly tilted to the left by a translating lever.
Figure 9C:
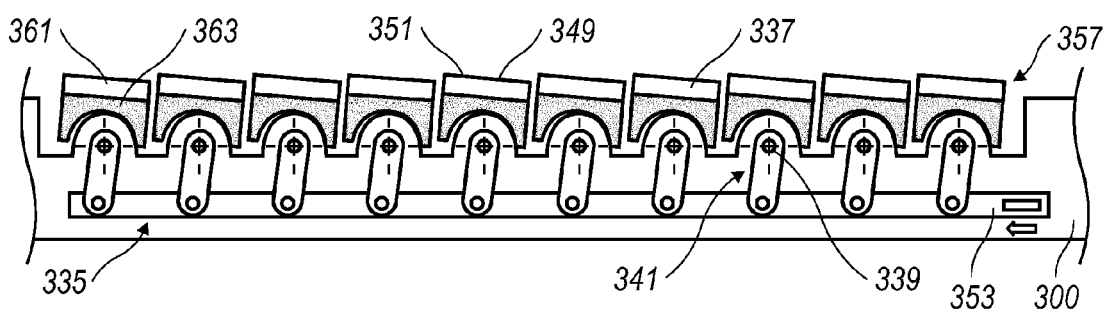
FIG. 9C illustrates the row of keys from FIG. 9B uniformly tilted to the right by the same translating lever.
Figure 10A:
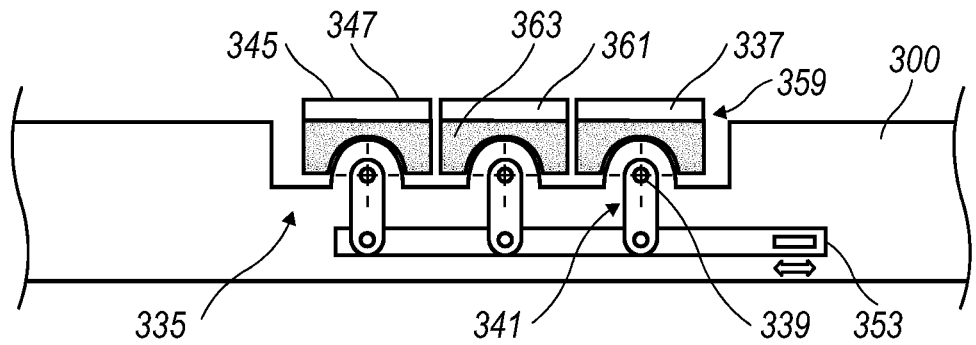
FIG. 10A illustrates the designated column of keys from FIG. 8 in an untilted orientation.
Figure 10B:
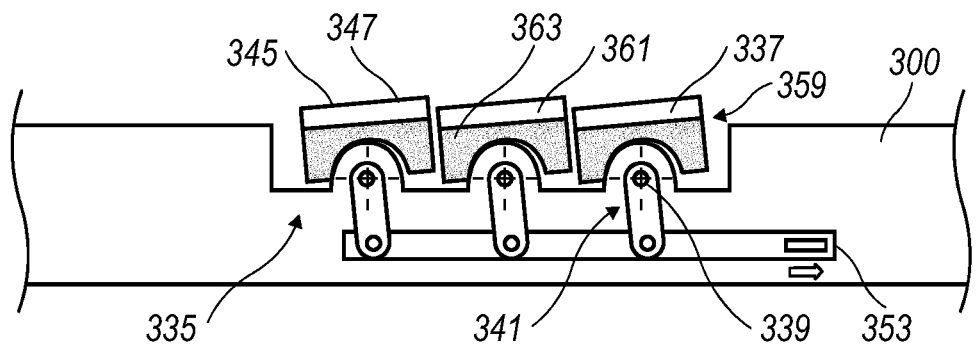
FIG. 10B illustrates the column of keys from FIG. 10A with upper parts of the keys uniformly down-tilted by a translating lever.
Figure 10C:
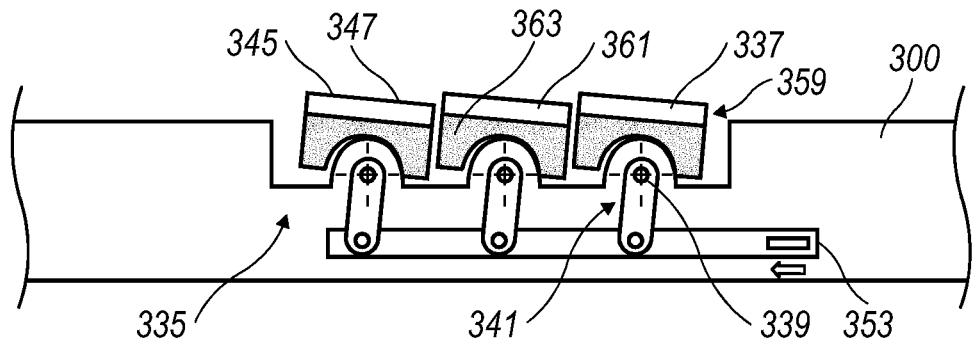
FIG. 10C illustrates the column of keys from FIG. 10A with upper parts of the keys uniformly up-tilted by a translating lever.
Figure 11:
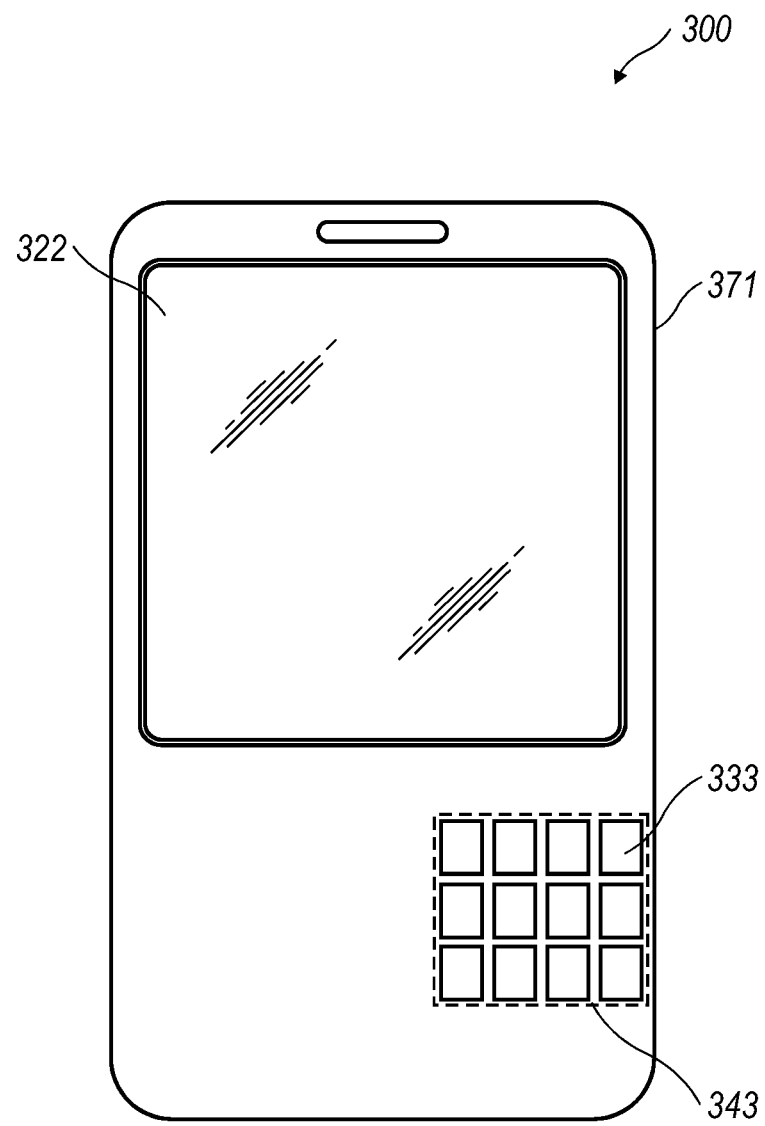
FIG. 11 illustrates a group of keys aggregated on a platform for unitary tilting relative the handheld communication device.
Figure 12:
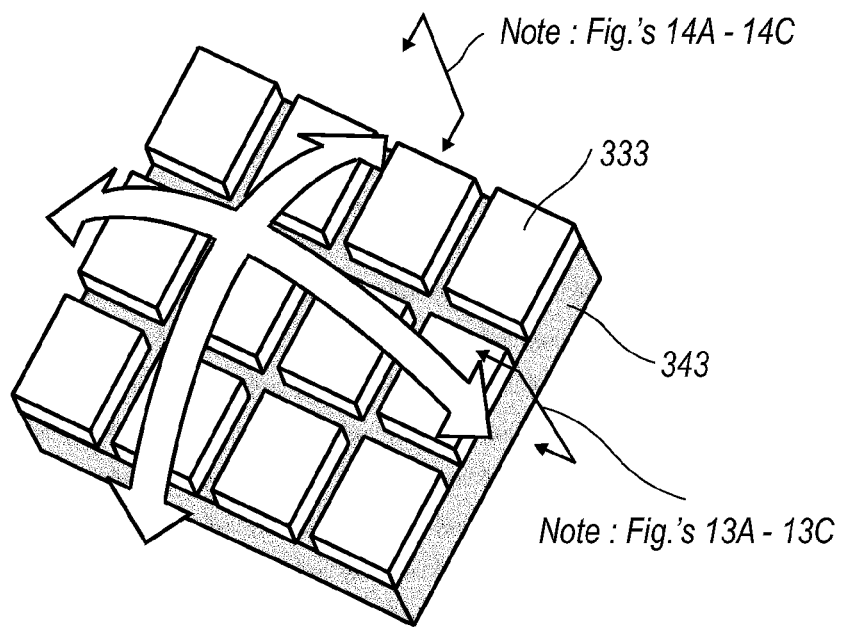
FIG. 12 is a perspective view of twelve keys mounted on a platform and the keys are fixed relative one another.
Figure 13A:
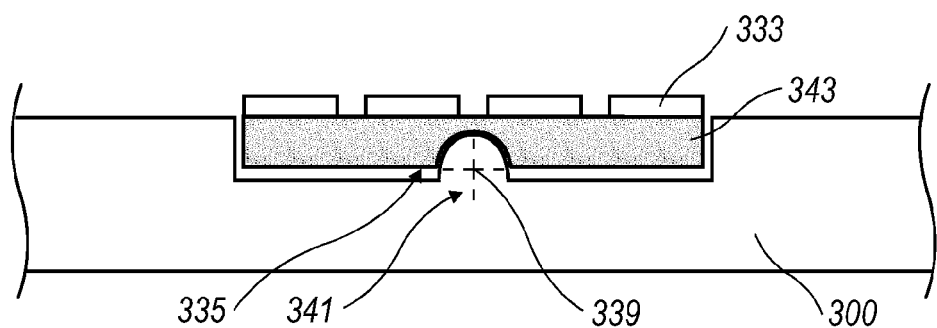
FIG. 13A illustrates a cross-sectional view of a row of keys from FIG. 12 in an untilted orientation.
Figure 13B:
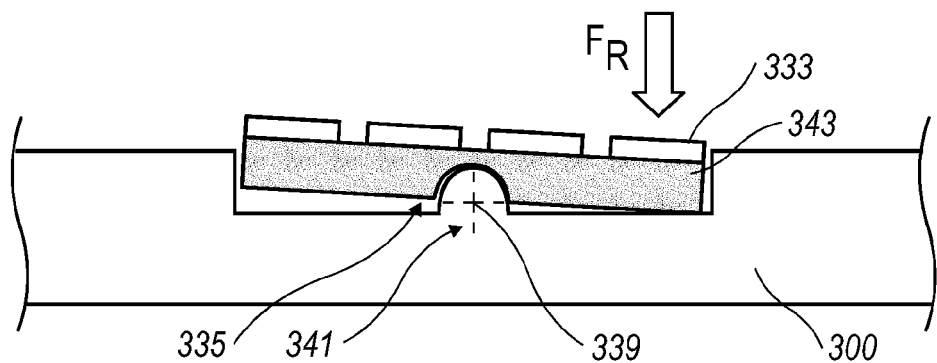
FIG. 13B shows the cross-sectional view of FIG. 13A rocked downward on the right-hand side.
Figure 13C:
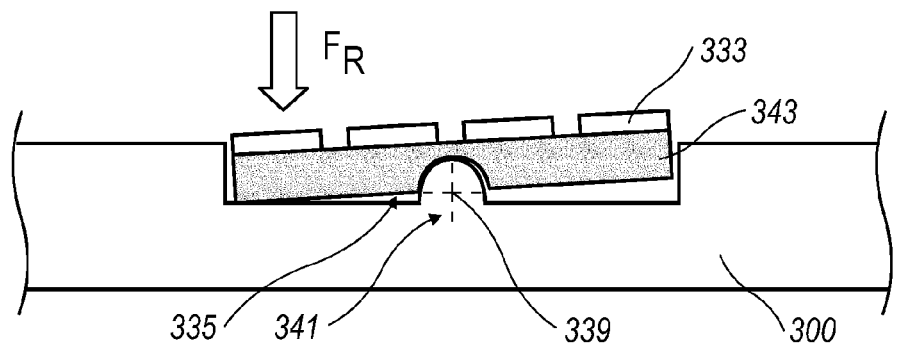
FIG. 13C shows the cross-sectional view of FIG. 13A rocked downward on the left-hand side.
Figure 14A:
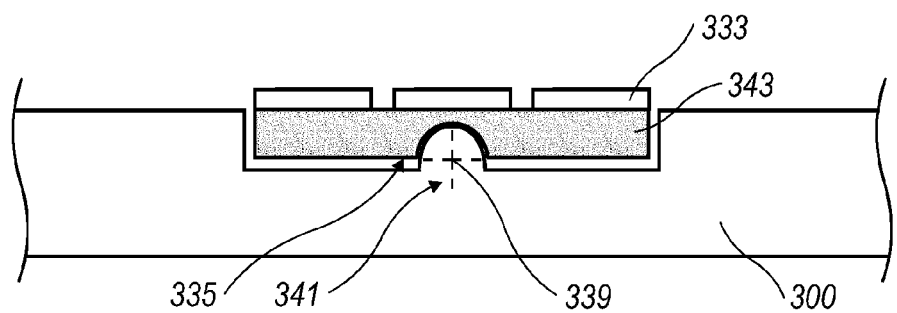
FIG. 14A illustrates a cross-sectional view of a column of keys from FIG. 12 in an untilted orientation.
Figure 14B:
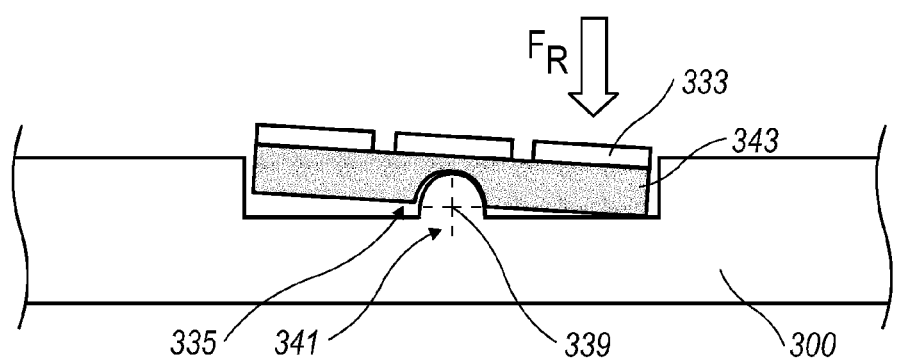
FIG. 14B shows the cross-sectional view of FIG. 14A with the lower part of the platform rocked downward.
Figure 14C:
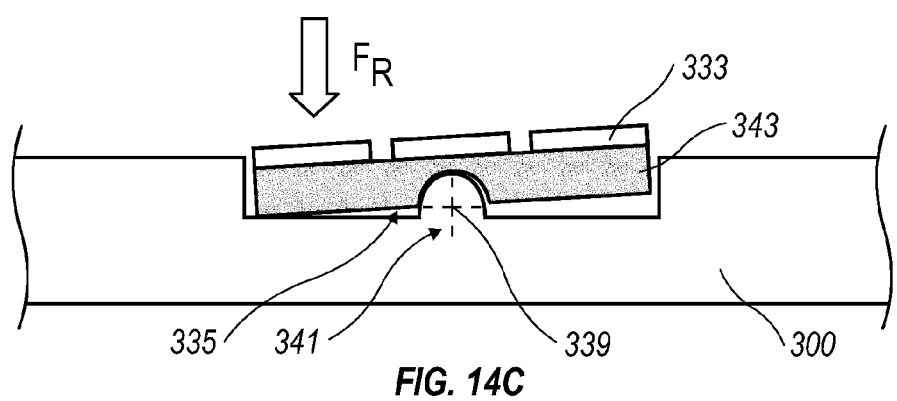
FIG. 14C shows the cross-sectional view of FIG. 14A with the upper part of the platform rocked downward.

In FIG. 8, a row 357 of pivot keys 333 are shown that rock about a plurality of vertically oriented pivot axes 339. Similarly, a column 359 of pivot keys 333 are also shown that rock about a plurality of horizontally oriented pivot axes 339. FIG. 9A shows a row 357 of pivot keys 333 in an untilted configuration. FIG. 9B shows the row 357 of pivot keys 333 rocked to the left in response to the lever 353 being pulled to the right. FIG. 9C shows the row 357 of pivot keys 333 rocked to the right in response to the lever 353 being pushed to the left. In a related manner, FIG. 10A shows a column 359 of pivot keys 333 in an untilted configuration. FIG. 10B shows the column 359 of pivot keys 333 with the upper part 345 of each rocked down in response to the lever 353 being pulled down. FIG. 10C shows the column 359 of pivot keys 333 with the lower part 347 thereof rocked down in response to the associated lever 353 being pushed upwardly.

It has also been determined that discomfort can be caused by the amount of pressure experienced at the point of contact between the user's actuating digit (thumb/finger) and the top engagement surface 337 of an input key 333. Normally, this is because the finger usually engages the top surface 337 of the key 333 at an angle to the surface 337 so that the area making contact is relatively low. Therefore, a solution is to increase the surface area across which contact is made. Since user's typically strike the actuable input keys 333 at a natural angle from their normal hand positions on the communication device 300, it is not practical to expect a behavioral change in the user that would increase the key engagement area of contact. Therefore, key configurations that improve the contact area between a user's actuating digit (thumb/finger) are disclosed. In general, in addition to increasing the surface contact upon actuation, reorientation of the top engagement surface 337 of the input key 333 also occurs.

Referring to FIGS. 16A and 16B, an adaptive input 333 for a handheld communication device 300 is illustrated. In FIGS. 16A and 16B, the input 333 takes the form of an actuable input key 333 including a base portion 363 and an upper portion 361 having a top engagement surface 337. The upper portion 361 variously reconfigures responsively to an applied actuation force ($F_A$) to permit the top engagement surface 337 to reorient to substantially parallelly oppose the applied actuation force ($F_A$).

FIGS. 17A and 17B depict an embodiment in which the upper portion 361 of the input key 333 is a substantially rigid plate and an intermediate portion 365 between the upper portion 361 and the base portion 363 is a resilient pivot interconnection that yields upon actuation and resumes an original configuration post-actuation.

FIGS. 18A and 18B depict an embodiment in which the upper portion 361 is a substantially rigid plate and the intermediate portion 365 is a gel-based interconnection that yields upon actuation and resumes an original configuration post-actuation. An example of such a gel-based interconnection would be a cushion layer 366 constituted by a flexible pouch, filled with highly viscous gel.

Figure 19A:
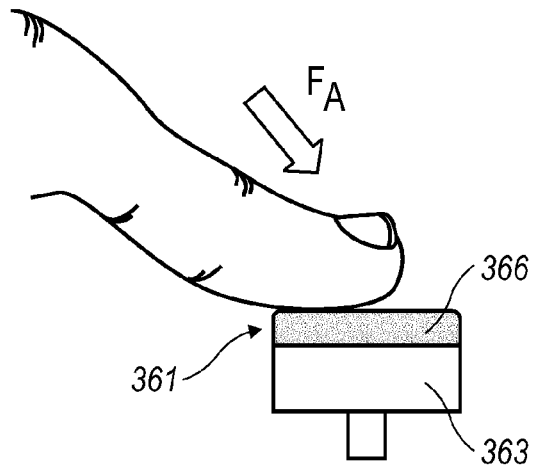
Figure 19B:
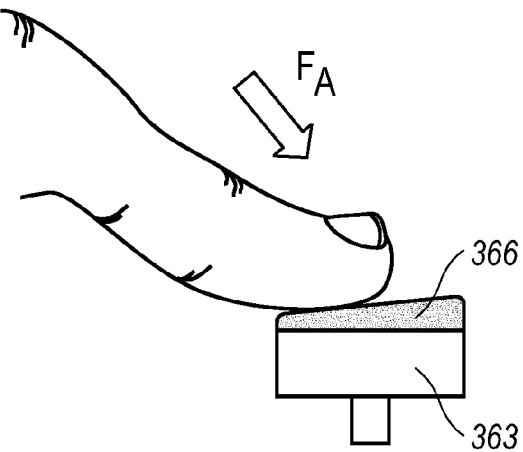
Figure 20A:
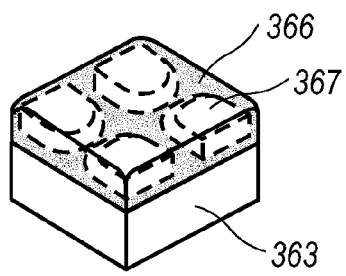
Figure 20B:
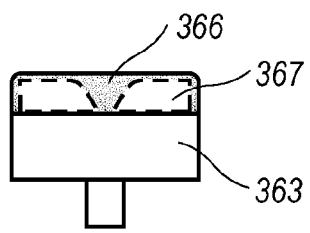

FIGS. 19A and 19B depict an embodiment in which the upper portion 361 is a flexible membrane atop the intermediate portion 365, and the intermediate portion 365 comprises a gel-based component configured to permit the flexible membrane to yield and conform upon actuation and resume an original configuration post-actuation. In the related embodiment of FIGS. 20A and 20B, the gel-based component of the upper portion 361 can be a cushion layer 366 constituted by a flexible pouch, filled with highly viscous gel. Optionally, the gel-filled cushion 366 can also include one or more flow-resistant baffles 367 configured to impede gel flow thereabout when local pressure is applied upon the cushion.

In a related aspect, it has been further determined that discomfort can also be caused when excessive actuation force is applied by the user's actuating digit (thumb/finger) upon the top engagement surface 337 of an input key 333. As described above, a first aspect of this solution is also to increase the surface area across which contact is made and a second aspect is to allow the top engagement surface 337 of the input key 333 to reorient to generally face and oppose the actuation force ($F_A$) being applied.

Figures 21A, 21B:
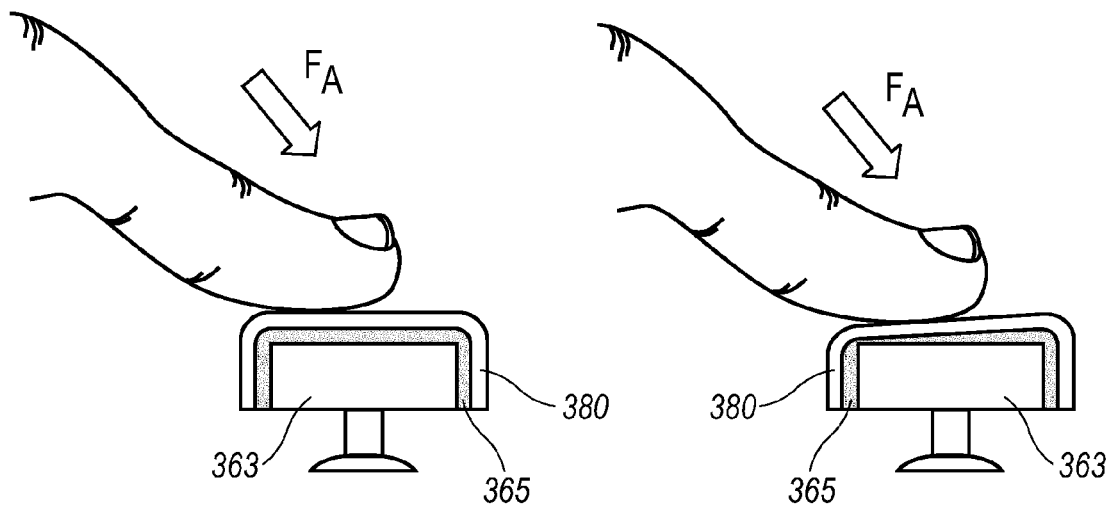

Accordingly, and referring to FIGS. 21A and 21B, in one embodiment, the upper portion of the input key is formed as a substantially rigid cap 380 and the intermediate portion 365 above the base portion 363 is an elastomeric interconnection that yields upon actuation and resumes an original configuration post-actuation. As depicted, the elastomeric interconnection compresses under excessive actuation force ($F_A$) thereby constituting a shock absorber. In this context, the magnitude of the actuation force ($F_A$) is excessive if it is greater than that which is required to affect input key 333 actuation. In the case of a dome-switch based input key as shown, the required actuation force is equal in magnitude to that which is necessary to actuate the dome switch.

Figures 22A, 22B:
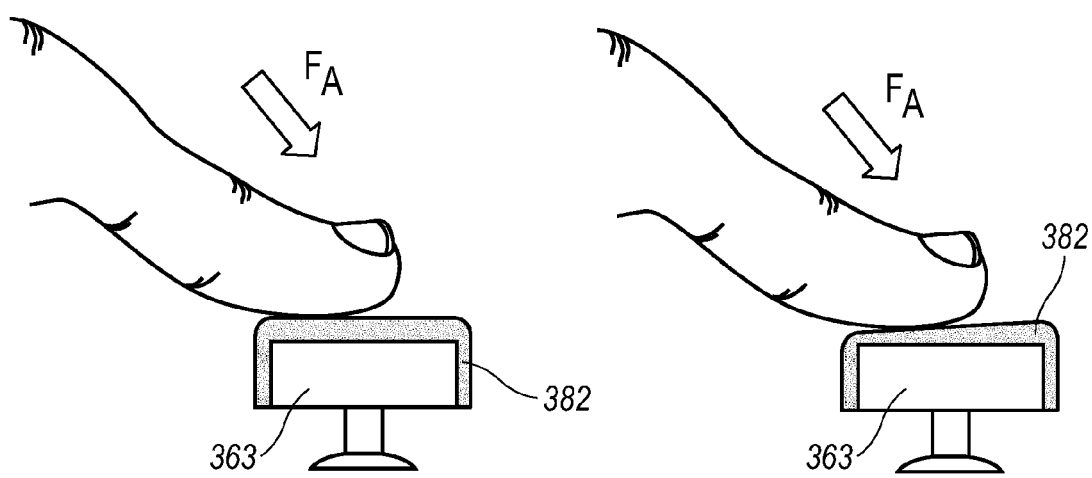

In the alternative configuration shown in FIGS. 22A and 22B, the upper portion of the input key is an elastomeric cap 382 that yields upon actuation and resumes an original configuration post-actuation. Further, in this embodiment, the elastomeric cap 382 compresses under excessive actuation force thereby constituting the shock absorber for the user's engaging digit.

Figure 15:
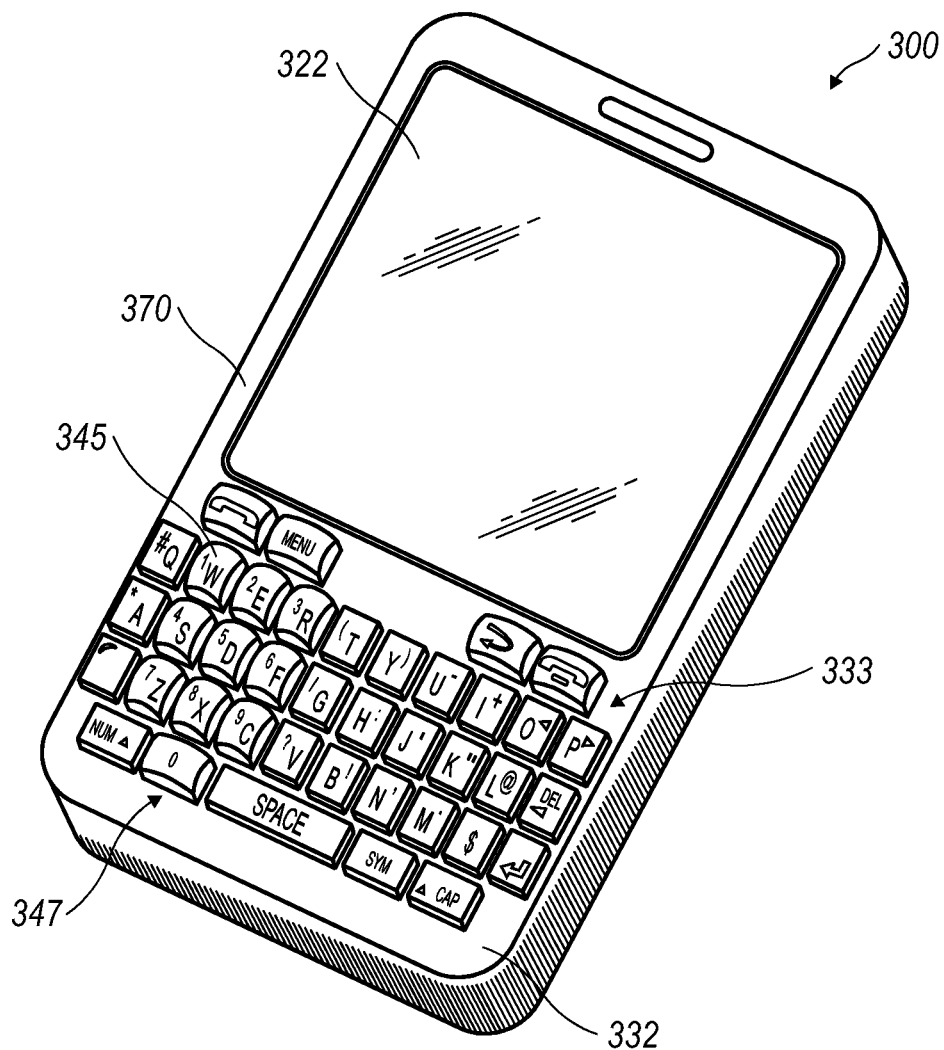
FIG. 15 is a perspective view of a handheld communication device having input keys, at least some of which have physically reconfigurable input keys.

In a final aspect of the present description, a communication device 300 having at least one, but preferably multiple physically reconfigurable input keys 333 is disclosed. Referring to FIG. 15, the communication device 300 is shown having a display screen 322 upon which characters are displayed. The communication device 300 further includes multiple actuable input keys 333, at least one of which has a physically configurable upper portion 361. The communication device 300 also comprises a microprocessor 338 configured to receive data indicative of an program running on the communication device 300 and to output data utilizable to physically configure the upper portion 361 of the actuable input key(s) 333 to a physical configuration corresponding to the indicated program running on the communication device 300. In this manner, the physical configuration of the keys 333 serves as an indicator to the user of what operational mode the communication device 300 is operating, as well as the keys 333 which are active in that mode. For example, if the communication device 300 is operating in telephone mode, the keys 333 that are active in telephone mode are physically signified by transfiguration into a configuration different from the balance of keys 333 that do not undergo reconfiguration.

In the embodiment shown in FIG. 15, the communication device 300 includes not just one, but a plurality of the actuable input keys 333 that each have a physically configurable upper portion 384. Regarding each of the plurality of keys 333, the physically configurable upper portion 384 of the key 333 has a top engagement surface 337 that expands away from a base portion 363 of the respective key 333 in correspondence with the indicated program running on the communication device 300. Preferably, the expansion of the top engagement surface 337 away from the base portion 363 of the respective key 333 is sufficient to be tactilely perceptible in comparison with non-expanded top engagement surfaces of adjacent, unaffected input keys 333.

In a related, but generally opposite configuration, the physically configurable upper portion 384 of each of the plurality of actuable input keys 333 has a top engagement surface 337 that recesses inwardly toward the base portion 363 of the respective key 333 in correspondence with the indicated program running on the communication device 300 and the recession of the top engagement surface 337 toward the base portion 363 of the respective key 333 is similarly tactilely perceptible in comparison with non-recessed top engagement surfaces 337 of adjacent input keys 333.

As depicted in FIG. 15, each of the plurality of actuable input keys 333 has at least one character associated therewith and the microprocessor 338 is further configured to receive data indicative of an actuated input key and to output data indicative of an associated character determined to correspond to the indicated input key. Still further, in the embodiment of FIG. 15, the microprocessor 338 is configured to, and has output data that has been utilized to physically expand the upper portions 361 of actuable input keys 333 constituting a telephone keypad 385 because the indicated program running on the communication device 300 is a telephone program.

Exemplary embodiments have been described hereinabove regarding both communication devices 300, as well as the communication networks 319 within which they can operate. Again, it should be appreciated that the focus of the present disclosure is providing a communication device 300 with a reconfigurable keyfield 332. Various modifications to and departures from the disclosed embodiments will occur to those having skill in the art. The subject matter that is intended to be within the spirit of this disclosure is set forth in the following claims.

What is claimed is:

1. An adaptive input for a handheld communication device comprising:
    an actuable button input key comprising a base portion and an upper portion having a top engagement surface; and
    an intermediate portion between the top engagement surface and the base portion that variously reconfigures upon actuation responsively to an applied force approximately exceeding an actuation force and at an angle to the top engagement surface to permit the top engagement surface to reorient to substantially parallelly oppose the applied force and wherein the intermediate portion is coextensive with the upper portion, and further wherein the intermediate portion comprises a gel-based component that includes flow-resistant baffles configured to slow gel flow within the gel-based component upon actuation.

2. The input for a handheld communication device as recited in claim 1, wherein the upper portion is a substantially rigid plate.

3. The input for a handheld communication device as recited in claim 1, wherein the upper portion is a flexible membrane.

4. An adaptive input for a handheld communication device comprising:
    an actuable button input key comprising a base portion and an upper portion comprising a flexible membrane having a top engagement surface; and
    an intermediate portion between the top engagement surface and the base portion that variously reconfigures responsively to an applied actuation force to permit the top engagement surface to reorient to substantially parallelly oppose the applied actuation force, wherein the intermediate portion comprises a gel-based component configured to permit the flexible membrane to yield and conform upon actuation and resume an original configuration post-actuation, wherein the gel-based component further comprises flow-resistant baffles configured to slow gel flow within the gel-based component upon actuation.

* * * * *